Nov. 3, 1970 — A. M. WILSON — 3,538,415

FAST BATTERY CHARGER

Original Filed April 17, 1967

INVENTOR
ARTHUR M. WILSON

ATT'Y.
James P. McAndrews

United States Patent Office 3,538,415
Patented Nov. 3, 1970

3,538,415
FAST BATTERY CHARGER
Arthur M. Wilson, Plainville, Mass., assignor to Texas Instruments Incorporated, Dallas, Tex., a corporation of Delaware
Continuation of application Ser. No. 631,402, Apr. 17, 1967. This application Oct. 17, 1969, Ser. No. 866,110
Int. Cl. H02j 7/04, 7/16
U.S. Cl. 320—32                                7 Claims

ABSTRACT OF THE DISCLOSURE

A fast and safe battery charger capable of charging a battery in less than one hour comprises a charging circuit having a controlled rectifier in series with a power source and a battery to be charged, a control circuit regulating the controlled rectifier in response to control circuit voltage, the control circuit including temperature responsive resistance means so that voltages in the control circuit vary with battery charge condition and with ambient and battery temperatures, and Zener diode means limiting control circuit voltage for interrupting battery charging if the battery becomes overheated and for automatically terminating charging when the battery is brought to fully charged condition.

---

This application is a streamline continuation of Ser. No. 631,402 filed Apr. 17, 1967.

In charging sealed batteries such as nickel-cadmium, nickel zinc, silver zinc and lead acid batteries and the like, oxygen gas is evolved at the positive battery electrodes, particularly as the batteries are brought to fully charged condition. This gas is continuously recombined within the batteries to avoid the development of excessive battery pressures. However, as the recombination of the gas tends to generate a considerable amount of heat, such batteries are conventionally charged at relatively low rates on the order of one-sixteenth their one hour discharge rate to assure that the gas is recombined at a suitable rate without developing excessive battery pressures and temperatures. At such low charge rates, the batteries can remain on continuous overcharge in the charging circuits without damage after the batteries have been fully charged but the battery charging cycles are disadvantageously long. That is, the time required for adequate battery charging is usually much longer than the service times during which the batteries are discharged.

When attempts have been made in the prior art to achieve fast charging of such sealed batteries, the effects of variations in ambient temperature, in gas recombination rates in the batteries, and the like have seriously limited the usefulness of such fast chargers. In particular, prior art fast chargers have tended to supply the batteries with substantially less than the desired charge or have run the risk of developing excessive battery pressures and temperatures, frequently resulting in destruction of the batteries. Such prior art fast chargers have also been of excessively complex and expensive construction.

It is an object of this invention to provide a novel and improved battery charger; to provide a battery charger capable of charging sealed nickel-cadmium batteries and the like within as little as six minutes; to provide a fast battery charger capable of charging such batteries at rates as high as ten times the ampere-hour capacities of the batteries; to provide a fast battery charger capable of fully charging batteries of different characteristics to the desired charge level; to provide a fast charger capable of charging batteries to the desired charge level at different ambient temperatures; to provide a charger capable of fast battery charging without developing excessive battery pressures and temperatures; and to provide such a fast battery charger which is of simple and inexpensive construction.

Briefly described, the fast battery charger of this invention includes a charging circuit in which a controlled rectifier having a gate or control electrode is arranged in series with a power source and a battery to be charged, the power source preferably comprising a full wave rectified alternating current source. A selectively variable current-limiting resistance is preferably disposed in series with the controlled rectifier in the charging circuit.

A control circuit is arranged for applying a control bias to the gate electrode of the rectifier. One resistance element, which preferably displays a sharp increase in resistance in response to increased temperature, is connected in the control circuit to be responsive to the temperature of the battery to be charged. Preferably another resistance element, which displays a gradual increase in resistance with increasing temperature, is connected in series in the control circuit and is arranged to be responsive to the ambient temperature of the controlled rectifier.

A Zener diode means is arranged to limit voltage in the charging and control circuits. That is, the Zener diode means is arranged to limit control circuit voltage to the sum of the desired end-of-charge voltage of the battery, the minimum gate voltage required for rendering the controlled rectifier conductive, and the expected voltage drop over the control circuit resistances at the minimum gate current required for rendering the rectifier conductive and at the expected ambient and battery temperatures.

In this arrangement, when a battery having less than the desired end-of-charge voltage is initially connected in the charging circuit, control circuit voltage during each half cycle of the power source is adequate to render the controlled rectifier conductive. At the end of each half cycle, charging circuit voltage falls to zero and the rectifier stops conducting. Thus, the battery is rapidly charged in a series of charging pulses. Then, as the battery is brought to fully charged condition, battery potential increases and control circuit voltage as limited by the Zener diode means becomes unable to furnish sufficient control circuit current to render the controlled rectifier conductive. At this point battery charging is automatically terminated.

If the battery tends to become overheated during charging due to excessively high ambient temperature, due to excessive oxygen evolution in the battery or for any other reason, the resistance element in the charger responsive to battery temperature sharply increases in resistance and interrupts battery charging before the battery is heated to an excessive extent. When the battery temperature thereafter decreases during the interruption of charging, charging of the battery is automatically resumed.

It is found that the controlled electrode is slightly heated during charging of the battery and that the ambient temperature to which the rectifier is exposed is also subject to variation. These temperature variations result in variation in the control electrode current required for rendering the controlled rectifier conductive. However, one resistance element in the control circuit of the charger of this invention is responsive to the ambient temperature of the rectifier for regulating control electrode current so that charging of the battery is terminated at the proper time without risk of overcharging or undercharging the battery even at very high or low temperatures.

In this way, the charger of this invention perimts rapid and substantially complete charging of the battery without risk of developing excessive battery temperatures and pressures. The battery may remain in the charger in fully charged condition without risk of overcharging or overheating, and the charger will periodically resume charging of the battery if the battery charge level should fall at any time due to self-discharge or the like.

Other objects, advantages and details of the charger of this invention appear in the following detailed description of preferred embodiments of the invention, the description referring to the drawing.

Figure 1:
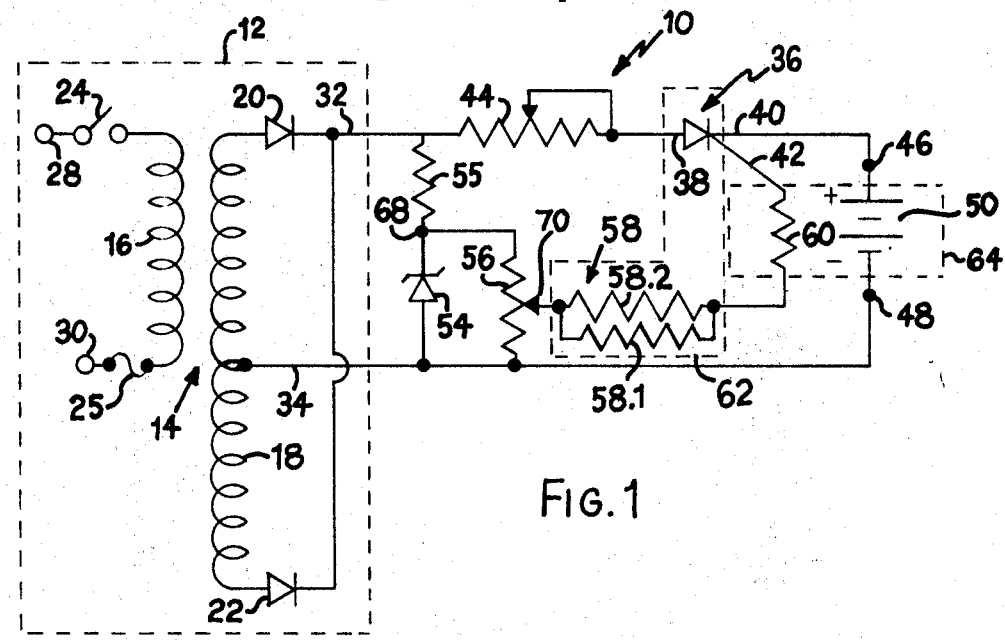
FIG. 1 is a schematic diagram illustrating the charger of this invention.

Referring to the drawing, 10 in FIG. 1 illustrates the fast battery charger of this invention which is shown to include a power source as indicated by the broken line 12. The power source preferably includes a transformer 14 having a primary winding 16 and a secondary winding 18 and preferably includes a pair of diodes 20 and 22. The primary winding is preferably connected to a conventional 110 v. alternating current line diagrammatically indicated in FIG. 1 by the terminals 28 and 30, and the diodes 20 and 22 are preferably connected to the secondary winding in a conventional manner for providing full wave rectification of the secondary winding current as illustrated. If desired, a manual control switch 24 and a fuse 25 are incorporated in the power source as shown to facilitate operation and to protect the charger against short circuits.

In accordance with this invention, a controlled rectifier 36 having an anode 38, a cathode 40 and a gate or control electrode 42 is arranged in series with the power source 12 to form a charging circuit. Preferably, the charging circuit includes a selectively variable current-limiting resistor 44 in series with the controlled rectifier and includes terminals 46 and 48 by which a battery 50 can be detachably connected in the charging circuit in series with the controlled rectifier and power source.

A Zener diode 54, preferably in series with a current-limiting resistor 55 and in parallel with a potentiometer or voltage divider 56, is connected between the lines 32 and 34 as illustrated in FIG. 1.

In accordance with this invention, the charger 10 also includes resistor elements 58 and 60 connected in series with each other to form a control circuit, the control circuit being arranged between the top of the potentiometer 56 and the rectifier gate electrode 42 as shown in FIG. 1.

The resistance element 58 preferably comprises a resistor of positive temperature coefficient which displays a gradual increase in resistance in response to an increase in temperature, this resistance element being arranged within the charger 10 close to the controlled rectifier 36 so that the resistor is responsive to the ambient temperature of the controlled rectifier as indicated by the broken line 62 in FIG. 1.

The resistance element 60 preferably comprises a strip of positive temperature coefficient material which displays an anomalous, sharp increase in resistance at a selected temperature, this resistance element being arranged within the charger 10 close to the battery 50 so that the resistor is responsive to the temperature of the battery as indicated by the broken line 64 in FIG. 1. Preferably, the resistor 60 is adapted to display an anomalous increase in resistance of 1000% or more in response to a temperature increase on the order of 30° centigrade.

For example, in a preferred embodiment of the charger 10 adapted to charge sealed nickel-cadmium batteries having desired end-of-charge voltages from 1.5 v. to 7.5 volts, any conventional transformer 14 and diodes 20 and 22 are employed for establishing a maximum potential difference in the lines 32 and 34 on the order of about 18 v. peak. The silicon controlled rectifier 36 is preferably rated at 7 amps D.C., 50 v. peak inverse voltage, and has a maximum gate current of 10 milliamps and a maximum gate voltage of 1 v. Such a controlled rectifier is available from Texas Instruments Inc. of Dallas, Tex., under Cat. No. TI3010. The selectivity variable resistor 44 is preferably variable from 4.0 to 1.0 ohms. The Zener diode 54 preferably comprises a 1 watt Zener such as is available from P. R. Mallory and Company, Inc. of Indianapolis, Ind., under Cat. No. ZA10A, which Zener is adapted to become conductive when the voltage at the junction 68 reaches a minimum of 10 volts. However, any relatively inexpensive Zener diode may be used in the charger of this invention. The resistor 55 preferably provides 27 ohms resistance and the potentiometer 56 is preferably variable from 0 to 100 ohms.

Figure 2:
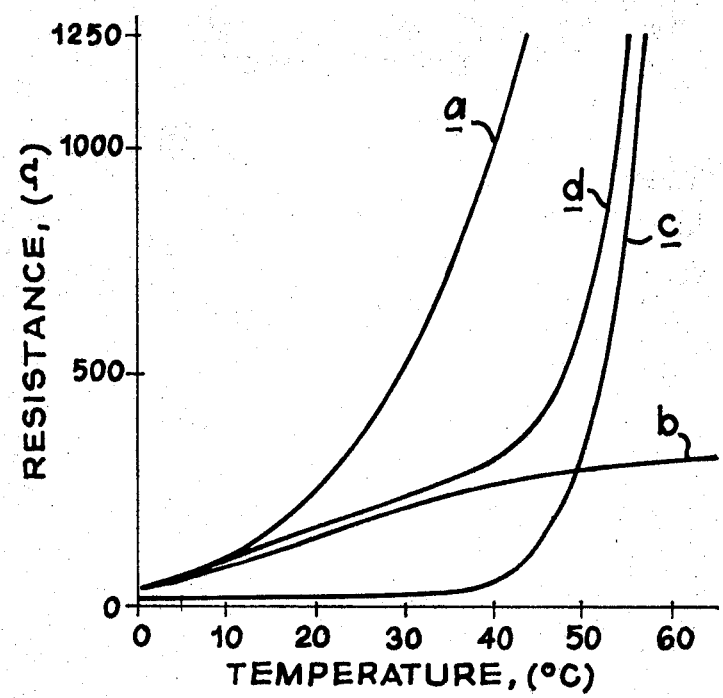
FIG. 2 is a graph illustrating the temperature responsive resistance characteristics of components of the charger of FIG. 1.

In this embodiment of the invention, the resistor 58 preferably comprises a conventional 350 ohm resistor 58.1 connected in parallel with a strip 58.2 of positive temperature coefficient material embodying barium, strontium, lanthanum and titanium oxide having the empirical formula, $Ba_{.600} Sr_{.397} La_{.003} TiO_3$, which material has a Curie point of 0° centigrade, a room temperature resistance of about 200 ohms, and is adapted to display an increase in resistance per degree centigrade increase in the ambient temperature of the rectifier 36 over a selected range of temperatures as indicated by curve $a$ in FIG. 2. In this arrangement, the resistance element 58 as a whole displays an increase in resistance in response to increase in ambient temperature as indicated by curve $b$ in FIG. 2.

The resistance element 60 preferably comprises a strip of positive temperature coefficient material having a Curie point of 60° centigrade and a resistance of 10 to 20 ohms at room temperature, which material is adapted to display a sharp or accelerated increase in resistance on the order of 1000% or more at a rise in temperature from 45° C. and 55° C. as indicated by curve $c$ in FIG. 2. Such a positive temperature coefficient material is made in well known manner, for example, by combining the positive temperature coefficient material described with reference to resistor strip 58.2 with another positive temperature coefficient material, in a ratio of 65 to 35 parts by weight respectively, this latter material embodying barium, lanthanum and titanium oxide having the empirical formula $Ba_{.991} La_{.003} TiO_3$ and having a Curie point of 120° centigrade. Such materials combined in the resistor 60 are available from National Lead Company, Niagara Falls, N.Y., under Cat. Nos. TAM5014 and TAM5013 respectively. As such positive temperature coefficient materials are known in the art, they are not further described herein and it will be understood that the resistors 58 and 60 are adapted to display temperature responsive characteristics as illustrated in FIG. 2. Curve $d$ in FIG. 2 indicates the change in resistance of the series combination of resistors 58 and 60 in response to increase in ambient temperature.

In this arrangement, the charger 10 is capable of providing fast, safe and substantially complete charging of a battery 50 connected in the charging circuit. For example, when the components of the charger have the specific characteristics described above and when the battery 50 comprises a four-cell nickel-cadmium battery having 500 milliampere hours capacity, an internal resistance of 200 milliohms and a desired end-of-charge voltage of 6 v., the charger 10 is operated in the following manner. First, the potentiometer 56, if employed, is adjusted so that the control circuit voltage at point 70 (see FIG. 1) as adjusted by the potentiometer (Vzener-pot.) equals the sum of the desired end-of-charge voltage (ECV) of the battery 50 plus the minimum voltage at the gate electrode (Vgate min.) necessary for rendering the controlled rectifier 36 conductive plus the expected voltage drop across the resistances 58 and 60 at the expected ambient and battery temperature and at the minimum gate electrode current [I gate min. $(R_{58}+R_{60})$] necessary for rendering the controlled rectifier conductive. That is:

Vzener-pot.—[I gate min. $(R_{58}+R_{60})$
+Vgate min.+ECV]=0

For example, assuming that the ambient temperature is 25° C., that the expected battery temperature during charging will be 25° C., and that the minimum gate electrode current and voltage necessary for rendering the controlled rectifier conductive equal 5 milliamperes and 700 millivolts respectively, the resistors 58 and 60 provide resistance as indicated in FIG. 2 and the potentiometer 56 is adjusted to provide 81.8 ohms resistance. That is, Vzener-pot. equals 8.18 volts in the preferred embodiment.

The selectively variable resistance 44 is then adjusted to provide approximately 1 ohm resistance so that the charging circuit voltage as limited by the Zener diode means is adapted to charge the battery 50 at a relatively constant rate of approximately 4 amperes.

In this arrangement, when the battery 50 is connected in the charge circuit as illustrated and the control switch 24 is closed, the charger 10 rapidly charges the battery in a series of charging pulses. That is, the battery potential being less than the desired end-of-charge voltage for the battery, the control circuit voltage as limited by the Zener diode 54 and potentiometer 56 is sufficient to render the controlled rectifier conductive during each half wave provided by the power source for applying a charging pulse to the battery. At the end of each half wave, charging circuit voltage drops to zero and the controlled rectifier stops conducting. The battery is thus charged in a series of charging pulses. However, as the battery is brought to fully charged condition, battery potential increases until, as the battery potential reaches the desired end-of-charge voltage, the control circuit voltage as limited by the Zener diode and potentiometer becomes unable to provide sufficient gate electrode current to render the controlled rectifier conductive. At this point, charging of the battery is automatically terminated. In this way, the described battery is brought to fully charged condition in approximately 10 minutes. The battery can remain in the charging circuit but as the controlled rectifier no longer conducts, further charging of the battery does not occur. However, if the battery is permitted to remain in the charging circuit for any extended period of time so that battery potential falls due to self-discharge of the battery or for any other reason, the controlled rectifier 36 again becomes conductive to automatically resume battery charging and to return the battery to fully charged condition.

It has been found that during charging of the battery, the controlled rectifier becomes slightly heated with the result that the rectifier conducts in response to a relatively lower gate electrode current. However, in the charger 10 of this invention, the resistance 58 is responsive to any increase in temperature of the controlled rectifier to display slightly increased resistance. That is, the resistance 58 substantially tracks the temperature of the controlled rectifier, whether due to rectifier heating or variation in ambient temperature, to assure that the controlled rectifier is not rendered conductive after the battery 50 has been brought to fully charged condition. In order to prevent interference with this tracking function of the resistor 58 by the resistor 60, the resistance 58 is preferably at least about 10 times greater than the resistance 60 at room temperature.

The resistor 60 is responsive to battery temperature to assure that, despite the fast charging of the battery, battery charging is safely accomplished without risk of excessively heating the battery. That is, if the battery 50 should tend to become slightly overheated due to excessive oxygen evolution during charging, or for any other reason, the resistance 60 is responsive to such increase in battery temperature to provide substantially greater resistance in the charge control circuit, thereby interrupting charging of the battery for the period of time that the battery is overheated. For example, if battery temperature should rise to 55° C., the resistance 60 provides almost 1000 ohms resistance in the control circuit as indicated in FIG. 2, to assure that control circuit voltage is inadequate to render the controlled rectifier conductive. When the battery cools during this interruption of battery charging, the charger 10 automatically resumes battery charging to bring the battery to fully charged condition. The resistor 60 also provides a fail-safe feature in the charger 10 in that, if the Zener diode 54 should fail so that the battery is charged at an excessive rate, the resistor 60 is responsive to any overheating of the battery to interrupt battery charging before battery heating becomes excessive.

It is noted that, with the diodes 20 and 22 located as shown, full wave rectification of alternating line current is provided. The charger of this invention is also operable where only half wave rectification of the line current is provided. For example, if the diodes 20 and 22 are removed and the lines 32 and 34 are connected to the ends of the secondary transformer winding 18, the power source provides half wave rectification of the line current for charging the battery 50 in accordance with this invention.

Although, the resistances 58 and 60 have been described as separate resistance elements, it will be understood that the functions of both of these elements can be incorporated in a single resistance member. Conversely, where several batteries connected in series are to be charged at the same time in the charger of this invention, the resistance 60 could comprise a plurality of separate resistances connected in series, these separate resistors bieng arranged to be responsive to the temperatures of the respective batteries. It should be understood that this invention includes all modifications and equivalents of the illustrated embodiments of the invention that fall within the scope of the appended claims.

I claim:

1. A fast battery charger comprising a controlled rectifier connected in series with a power source and a battery to be charged, said rectifier having a control electrode, resistance means of positive temperature coefficient of resistance arranged to be responsive to battery temperature, said resistance means displaying an anomalous sharp increase in resistance in response to a selected increase in battery temperature and being connected in series with said control electrode to form a control circuit, and Zener diode means connected between said power source and neutral to limit voltages in said control circuit for automatically tapering and terminating battery charging as the battery is charged to said selected charge level.

2. A fast battery charger as set forth in claim 1 including additional temperature responsive resistance means in said control circuit responsive to the temperature of said controlled rectifier for regulating control circuit voltages in response to said rectifier temperature.

3. A fast battery charger as set forth in claim 2 wherein said additional temperature responsive resistance means comprises resistance means of positive temperature coefficient of resistance connected in parallel with a resistor means of selected constant resistance, said additional resistance means displaying increasing resistance in response to increasing temperature of said controlled rectifier to maintain control circuit voltage drop constant with decreasing gate voltage of said controlled rectifier.

4. A fast battery charger as set forth in claim 3 having selectively variable resistance means in series with said controlled rectifier.

5. A fast battery charger as set forth in claim 4 having current limiting resistor means connected in series with said Zener diode means.

6. A fast battery charger as set forth in claim 5 wherein said Zener diode means includes a Zener diode connected in parallel with potentiometer means for permitting selective limitation of said control circuit voltages.

7. A fast battery charger as set forth in claim 6 including means connectable between said controlled rectifier and an alternating current power source providing full wave rectification of current from said source.

References Cited

UNITED STATES PATENTS

| | | | | |
|---|---|---|---|---|
| 2,967,988 | 1/1961 | Seright | 320—36 |
| 3,121,837 | 2/1964 | Holm | 322—33 |
| 3,241,028 | 3/1966 | Mas | 322—33 |
| 3,267,288 | 8/1966 | Maiden | 320—33 X |
| 3,281,638 | 10/1966 | Crawford | 321—16 |
| 3,292,071 | 12/1966 | McLaughlin | 320—33 X |
| 3,310,724 | 3/1967 | Grafham | 320—33 X |
| 3,341,764 | 9/1967 | Kongable | 320—33 X |
| 3,376,488 | 4/1968 | Walsh | 320—33 X |
| 3,457,489 | 7/1969 | Gentry | 320—22 |

J D MILLER, Primary Examiner

U.S. Cl. X.R.

320—33, 35, 36